No. 693,068. Patented Feb. 11, 1902.
H. C. & W. G. ROOME.
ELECTRICAL BURGLAR ALARM.
(Application filed Mar. 24, 1899.)
(No Model.)
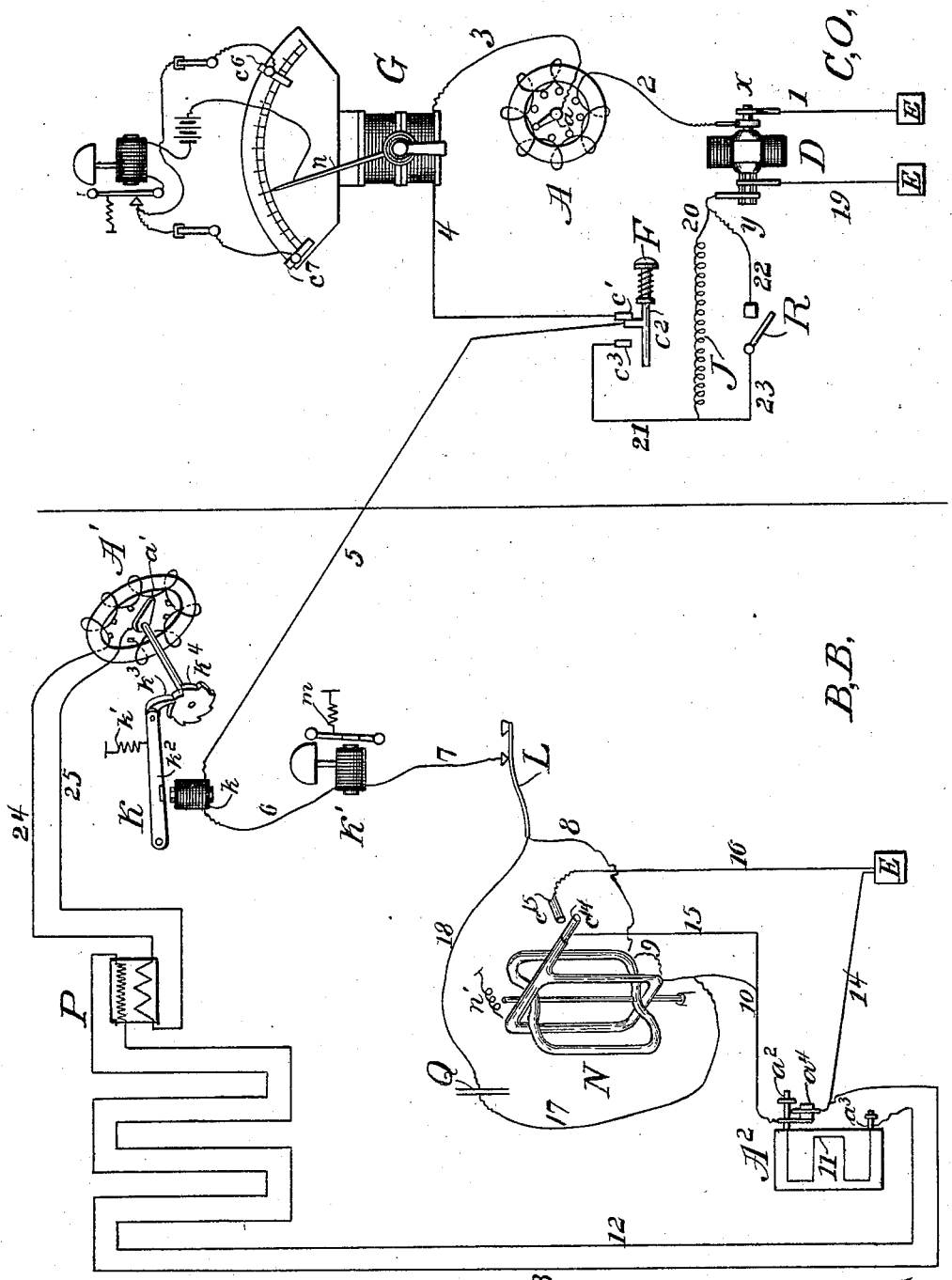
Witnesses
Inventors
Henry C. Roome
William G. Roome
by their atty.
Edwin H. Brown

United States Patent Office.

HENRY C. ROOME AND WILLIAM G. ROOME, OF JERSEY CITY, NEW JERSEY.

ELECTRICAL BURGLAR-ALARM.

SPECIFICATION forming part of Letters Patent No. 693,068, dated February 11, 1902.

Application filed March 24, 1899. Serial No. 710,298. (No model.)

*To all whom it may concern:*

Be it known that we, HENRY C. ROOME and WILLIAM G. ROOME, of Jersey City, county of Hudson, and State of New Jersey, have invented a new and useful Improvement in Electrical Burglar-Alarms, of which the following is a specification.

We will describe a burglar-alarm embodying our improvement and then point out the novel features in the claims.

In the accompanying drawing, A designates a choke-coil. We may make this by stamping up pieces of soft thin sheet-iron in the form of plates or disks, with large holes in the center. On each piece of iron so treated will be a thin ring. The thinner it will be the better. We japan or otherwise insulate the soft rings and place them one above another, so as to form a short cylinder. They may be riveted together with fiber or insulated plugs or secured together in any other manner with insulating material. Around this cylinder are wound a number of strands of wire. The action of the iron in closed magnetic circuit makes an induced current opposed to the current flowing in the turns of wire around the choke-coil and the degree of choke or self-induction may be regulated by increasing or decreasing the number of turns of wire. The action of the choke-coil can be varied greatly by simply changing the frequency of the alterations of the current. Thus it will be seen we have a device in the guarded structure by means of which we can produce varying results on the circuit by simply changing the frequency of the alternations at the central office, and these changes can be recorded on an alternating measuring instrument at the central office.

To illustrate the value of this invention, suppose we were to measure the resistance of the guarded structure just outside of the guarded structure. If now we could sever the wires from the central office without giving an alarm and at the same moment connect them to a resistance coil or rheostat having a similar resistance to that of the guarded structure, the measuring instrument at the central office would be widely deflected and the alarm given, as the action of the resistance-coil would be very different from the combined resistance of the resistance in the wiring and the choke-coil in the guarded structure. Suppose we could now take the resistance-coil that we had attempted to substitute and by adding iron to the center of it make a choke-coil out of it and keep adding iron until the needle of the measuring instrument was returned to the proper position on the scale. It is only necessary now that the frequency of the alternations be changed at the central office. This may be accomplished by varying the speed of the dynamo or by increasing or decreasing the number of poles in the field or armature, the two choke-coils having a relatively different number of turns in relation to the resistance of the guarded structure, also the amount of iron in the regular choke-coil being much different in closed magnetic circuit than in the artificial coil. It is noted that a portion of the resistance in the guarded structure consists of its protective wires, a portion being in the signaling instrument and the balance in the choke-coil. Now as they are not able on the outside of the guarded structure to separate these two it follows that their choke-coil being the convolutions of all the resistance must require a different amount of iron than the regular choke-coil, which has the resistance of the protective wires ahead of it. Now when the frequency of the alternations at the central office is changed the two choke-coils make a widely-different deflection in the measuring instrument and the alarm is sounded. In fact, it is practically impossible for any one to tamper with the circuit, as the alternations are frequently changed at the central office and they would be detected.

We show a system whereby the normal resistance of the main line or guarded structure need not be changed or altered, and yet by means of a transformer the deflection of the measuring instrument at the central office can be changed at will without altering the resistance of the guarded circuit. There is also shown a simple ratchet-wheel device for changing the strength of the circuit, which is controlled from the central office. The deflection of the measuring instrument may also be changed without altering the resistance of the circuit by simply changing the frequency of the alternations, the transformer or the choke-coil producing a varied effect on their respective circuits when the frequency is changed.

C O may represent the central office or place where the alarm is received. B B the guarded structure. The circuit may be traced from earth E by wire 1, collector-rings X of alternating-current generator or dynamo D, wire 2, and thence passing around a number of convolutions of the choke-coil A, this coil being provided with a finger $a$, which can be moved so as to be connected with a greater or lesser number of convolutions of the choke-coil A. As shown, the finger is so connected that the circuit coming from wire 2 must pass through two convolutions of wire about the choke-coil before it connects with the movable finger $a$, thence by wire 3 to the alternating-current measuring or recording instrument G, here shown as an electrical measuring instrument which may be similar in principle to a dynamometer, such as described by Edward Weston in his Patent No. 433,637, of August 5, 1890. Any desired alternating recording instrument may, however, be used—in fact, a double-relay system, one relay responding when the circuit is opened and adjusted to have its armature normally attracted and the other relay adapted to have its armature away from its magnet and only attracted when the choke-coil A′ is shunted out of circuit. When the door A² at the guarded structure is opened, the needle $n$ of the recording instrument G will be caused to impinge against the contact $c^6$, closing its local alarm-circuit, the needle $n$ being deflected away from this contact by the tension of a hair-spring, which tends to throw the needle to the extreme left when there is no current flowing through its coils.

We prefer to make the scale-piece behind the needle of some insulating material and contacts $c^6$ and $c^7$ movable and adjustable to any position on the scale. We show the head of a thumb-screw which may be used to set them rigid in any desired position.

By simply increasing or decreasing the speed of the dynamo D and changing the frequency of the alternations we can increase or decrease the choking effect of the choke-coil A′, located at the guarded structure, and produce a deflection on the recording instrument as the current is increased or decreased by the choking effects of the choke-coil A′. The needle $n$ of the recording instrument G can now be balanced and overcome the effects of the choke-coil A′ by moving the finger $a$ of the choke-coil A at the central office. This would produce the same effect on the recording instrument G as would be produced in a continuous-current circuit by being able to decrease or increase the resistance in the guarded structure from the central office and at the same time counteract the deflection of the needle at the central office by giving more or less voltage, necessary to overcome the change, so as to hold the needle at any desired point.

The generator or dynamo D is shown as a combination-dynamo. From the end $x$ alternating current is taken from the collector-rings. From the end $y$ direct or continuous current is taken from a commutator.

The burglar-alarm circuit can be traced from alternating-current-recording instrument G by wire 4, contacts $c'$ $c^2$ of push-button F, wire 5, magnet $k$ of the ratchet mechanism K, wire 6, bell K′, wire 7, call-key L, wire 8, passing into the rigid coil of the alternating-current relay N, coming out of this coil by wire 9 and passing into the movable coil, coming out of the movable coil by wire 10, thence to the metal of the door-spring $a^2$ of the attachment A², through A² by wire 11, coming out on the break-spring $a^3$, thence via wire 12 through the wiring-circuit, passing through the primary coil of the transformer P, returning through the wiring-circuit by wire 13 to the tongue $a^4$ of the door-spring $a^2$ of attachment A², and thence by wire 14 to earth at E. The shunt-circuit wire 15 runs from wire 10 to contact-point $c^{14}$ on the relay N. From the contact $c^{15}$ a wire 16 extends to the earth E. This relay N is similar to one described in a patent granted to William Maver, Jr., No. 482,440, dated September 13, 1892, and is very similar in construction and principle to the alternating-current relay G, being composed of fixed and movable coils, without any iron or magnetic material, and depends for its operation on the attraction of one coil for the other coil, the coil to which the wire 8 is connected being a fixed and immovable coil, and the other coil being pivoted and movable. A spring $n'$ is combined with this coil for moving it in one direction and acts to separate the contacts $c^{14}$ $c^{15}$. The tension of this spring is sufficient so that when the transformer P is in circuit the current is not strong enough to move the coil and close the contacts $c^{14}$ $c^{15}$. When, however, the door A² is opened and the wire 10 is connected through the door-spring $a^2$ to the tongue $a^4$, wire 14 to earth E, shunting out the transformer, the current is now strong enough to move the movable coil of the relay N so that the contacts $c^{14}$ $c^{15}$ are closed, closing the shunt-circuit by wire 16 to E.

Q is a condenser which acts to balance the inductance of the relay N by its capacity and to discharge into the relay N between each alternation of current. It serves to shorten the neutral or no-current moment between each alternation, its discharge being a practical alternation of the current, which will act to come in just ahead of the regular alternation and with the same polarity.

The wire 18 connects the condenser Q with one side of the relay at wire 8 and the wire 17 with the other side of the relay at wire 10.

The secondary current of the transformer P has its circuit completed by wire 24, some of the convolutions of the choke-coil A', finger a' of the choke-coil A', and wire 25, returning to the secondary coil of the transformer.

K is a ratchet mechanism adapted so that when its magnet $k$ is energized sufficiently to overcome the tension of a spring $k'$ on the armature $k^2$ it will move down, and the pawl $k^3$ at the end of the armature will engage one of the ratchet-teeth on the ratchet-wheel $k^4$ and advance it one tooth, turning the axle connected to it, and with it the finger $a'$ of the choke-coil A', moving this finger in successive steps from one contact-point to another, each contact-point inserting in succession extra lengths of the convolutions around the choke-coil A' into the secondary circuit of the transformer P. When the full number of turns have been inserted, the next movement of the finger to the next contact-point will act to cut out the choke-coil completely. The spring $m$ of the bell K' is adjusted so that the armature of this bell will respond only to a direct or continuous current of greater strength than the normal current. This is secured by means of the direct current from the end $y$ of the dynamo D, which may be traced from E by wire 19 to one of the brushes of the commutator on the end $y$ of the dynamo D. From the other brush a wire 20 extends to a resistance J, and thence by wire 21 to contact $c^3$ of the button F. When it is desired to ring the bell K' at B B, the push-button F is pushed in until the contact $c^2$ touches the contact $c^3$ and the bell K' will respond, its spring $m$ being adjusted so that the bell will respond to the direct or continuous current through the resistance J. The spring $k'$ of the ratchet mechanism K is adjusted so that the armature $k^2$ will not respond to the direct current when the resistance J is in circuit. To cause this magnet $k$ to be sufficiently magnetized, a switch R is provided at the central office, and by means of the wires 22 and 23 the resistance J can be shunted out. When the push-button F is pushed in so that the contacts $c^2$ and $c^3$ are connected, the armature of the magnet $k$ of the ratchet device K will respond and advance the finger $a'$ one step, thus changing the choke-coil of the secondary circuit of the transformer P. The transformer secondary circuit will now take more or less current from the primary circuit of the transformer by induction, and the recording instrument G will be deflected. To offset this deflection, the frequency of the alternations at the dynamo D may be changed, or the finger $a$ on the choke-coil A at the central office may be shifted. It will thus be seen that we here show a method by means of which the standing or deflections of the recording instrument G may be changed at will from the central office without changing the resistance of the circuit. These are important points, as the systems now in use depend entirely on a change of resistance, which makes it rather difficult to keep the signaling-bells and devices for changing the resistance in adjustment.

It will be observed that it makes no difference how many turns of the choke-coil A' are included in the secondary circuit of the transformer P. It does not change the resistance of the primary circuit or alarm-circuit, and when the armatures and springs of the instruments K and K' are once adjusted they will always work just the same if the direct or continuous current supplied by the wire 21 is of constant strength, and it makes no difference whether the whole choke-coil is in the secondary circuit or whether it is shunted out of the secondary circuit, the resistance of the primary circuit remains the same, and thus the shifting device produces no effect on the working of the armatures of K and K', as it does not alter the resistance of the primary circuit.

The choke-coil A' may, if desired, be connected directly to the wires 12 and 13 and the transformer P be dispensed with.

A specially-constructed magnet for alternating currents having laminated-iron cores may be used in place of the relay N. The condenser may also be used with such a magnet, if desired.

The bell K' and ratchet mechanism K may be combined, if desired, into one magnet with both armatures, or the armature of K may be used in addition to ring a bell and K' dispensed with, as it would do no harm to have the ratchet device shift the finger $a'$ every time a signal was given.

Intermittent or pulsatory currents may be used instead of alternating currents for the burglar alarm or signaling circuits. These would act on the secondary circuit of the transformer P, producing an alternating current in the secondary circuit, which would in turn be choked by the choke-coil A'. This would act to affect any recording instrument that might be used in its place.

The collector-rings on the end $x$ of the dynamo D may be dispensed with and a mechanism provided to give pulsating currents of the same polarity.

The instrument K may be constructed to act similarly to the press-magnet of a stock-printer, and the alternations be made at C O mechanically, as in a stock-printing ticker system. To operate the magnet $k$ of ratchet device K, it would only be necessary to stop the mechanical alternator at C O, which would act to send direct or continuous current into the circuit, causing the magnet $k$ to respond.

Our system may also apply to coverings for safes, vaults, &c.

We do not wish to confine ourselves to the use of the recording instruments shown, as other instruments might be used.

What we claim as new, and desire to secure by Letters Patent, is—

1. In a burglar-alarm system, the combination of a circuit extending between a central office and a guarded structure, a source at the central office for sending a continuous and an alternating current through the circuit and two sets of instruments at the guarded structure, one responsive to the alternating current and the other responsive to the continuous current and adapted to change the strength of the alternating current.

2. In a burglar-alarm, the combination of a circuit extending between the office and the guarded structure, a ratchet or movable device at the guarded structure controlled from the central office, a secondary circuit at the guarded structure, and means in said secondary circuit for changing the self-induction of the secondary circuit, said means being controlled by the ratchet, substantially as specified.

3. In a burglar-alarm, the combination of the alternating-current generator, energizing the circuit extending to the guarded structure, an alarm instrument, a transformer, and a ratchet or movable device in the secondary circuit of the transformer controlled by the central office, and adapted to change the self-induction of the circuit at the guarded structure, substantially as specified.

4. In a burglar-alarm, the combination of the alternating-current generator, the circuit extending to a guarded structure, an alarm instrument, a choke-coil or inductive device, and a ratchet or movable device controlled by the central office and adapted to change the self-induction of the circuit at the guarded structure, substantially as specified.

5. In a burglar-alarm system, the combination of the circuit extending to the guarded structure, a signaling instrument at the guarded structure, a ratchet or movable device at the guarded structure for changing the strength of current in the circuit and a signaling-circuit at the central office adapted to be varied so as to control the ratchet device, or to control the signaling instrument alone.

In testimony whereof we have signed our names to this specification in the presence of subscribing witnesses.

HENRY C. ROOME.
     WILLIAM G. ROOME.

Witnesses:
 H. S. C. CLUTSAM,
 P. S. MACLURE,
 GEORGE H. NEWKIRK,
 SARAH E. ROOME.